United States Patent
Ng et al.

(10) Patent No.: US 10,800,103 B2
(45) Date of Patent: Oct. 13, 2020

(54) ADDITIVE MANUFACTURING WITH ENERGY DELIVERY SYSTEM HAVING ROTATING POLYGON AND SECOND REFLECTIVE MEMBER

(71) Applicant: Applied Materials, Inc., Santa Clara, CA (US)

(72) Inventors: Hou T. Ng, Campbell, CA (US); Nag B. Patibandla, Pleasanton, CA (US); Ajey M. Joshi, San Jose, CA (US); Raanan Zehavi, Sunnyvale, CA (US); Jeffrey L. Franklin, Santa Cruz, CA (US); Kashif Maqsood, San Francisco, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 15/811,547

(22) Filed: Nov. 13, 2017

(65) Prior Publication Data

US 2018/0257299 A1 Sep. 13, 2018

Related U.S. Application Data

(60) Provisional application No. 62/469,466, filed on Mar. 9, 2017.

(51) Int. Cl.
*B29C 64/268* (2017.01)
*B29C 64/135* (2017.01)
(Continued)

(52) U.S. Cl.
CPC .......... *B29C 64/268* (2017.08); *B22F 3/1055* (2013.01); *B23K 26/0821* (2015.10);
(Continued)

(58) Field of Classification Search
CPC ........ B29C 64/268; B33Y 10/00; B33Y 30/00
See application file for complete search history.

(56) References Cited

U.S. PATENT DOCUMENTS

| 4,643,569 A | 2/1987 | Sullivan et al. |
| 6,359,255 B1 | 3/2002 | Yamamoto et al. |
| (Continued) | | |

FOREIGN PATENT DOCUMENTS

| EP | 2926925 | 10/2015 |
| JP | 11-033752 A | 2/1999 |
| (Continued) | | |

OTHER PUBLICATIONS

International Search Report and Written Opinion in International Application No. PCT/US2018/021747, dated Jun. 27, 2018, 16 pages.

(Continued)

*Primary Examiner* — Jacob T Minskey
*Assistant Examiner* — Melody Tsui
(74) *Attorney, Agent, or Firm* — Fish & Richardson P.C.

(57) ABSTRACT

An additive manufacturing apparatus includes a platform, a dispenser to dispense a plurality of layers of feed material on a top surface of the platform, and an energy delivery assembly. The energy delivery assembly includes a light source to emit one or more light beams, a first reflective member having a plurality of reflective facets, and at least one second reflective member. The first reflective member is rotatable such that sequential facets sweep the light beam sequentially along a path on the uppermost layer. The at least one second reflective member is movable such that the at least one second reflective surface is repositionable to receive at least one of the at least one light beam and redirect the at least one of at least one light beam along a two-dimensional path on the uppermost layer.

4 Claims, 11 Drawing Sheets

(51) Int. Cl.
  *B22F 3/105* (2006.01)
  *B23K 26/082* (2014.01)
  *B33Y 10/00* (2015.01)
  *B28B 1/00* (2006.01)
  *B33Y 30/00* (2015.01)
  *B29C 64/153* (2017.01)
  *B29C 64/245* (2017.01)
  *B29C 64/205* (2017.01)
  *B29C 64/209* (2017.01)
  *B29C 64/277* (2017.01)
  *B29C 64/273* (2017.01)
  *G02B 26/12* (2006.01)
  *G02B 26/08* (2006.01)
  *B29C 64/295* (2017.01)

(52) U.S. Cl.
  CPC ............ *B28B 1/001* (2013.01); *B29C 64/135* (2017.08); *B29C 64/153* (2017.08); *B29C 64/205* (2017.08); *B29C 64/209* (2017.08); *B29C 64/245* (2017.08); *B29C 64/273* (2017.08); *B29C 64/277* (2017.08); *B33Y 10/00* (2014.12); *B33Y 30/00* (2014.12); *B22F 2003/1056* (2013.01); *B29C 64/295* (2017.08); *G02B 26/0816* (2013.01); *G02B 26/12* (2013.01); *Y02P 10/295* (2015.11)

(56) References Cited

U.S. PATENT DOCUMENTS

| | | | |
|---|---|---|---|
| 8,784,720 | B2 | 7/2014 | Oberhofer et al. |
| 8,967,990 | B2 | 3/2015 | Weidinger et al. |
| 9,073,260 | B2 | 7/2015 | El-Siblani et al. |
| 9,073,261 | B2 | 7/2015 | El-Siblani et al. |
| 9,073,262 | B2 | 7/2015 | El-Siblani et al. |
| 9,079,355 | B2 | 7/2015 | El-Siblani et al. |
| 9,415,443 | B2 | 8/2016 | Ljungblad et al. |
| 2003/0052105 | A1 | 3/2003 | Nagano et al. |
| 2006/0215246 | A1 | 9/2006 | Kerekes et al. |
| 2013/0001834 | A1 | 1/2013 | El-Siblani et al. |
| 2013/0189435 | A1 | 7/2013 | Mackie et al. |
| 2014/0271328 | A1* | 9/2014 | Burris ............... B33Y 10/00 419/53 |
| 2015/0102531 | A1 | 4/2015 | El-Siblani et al. |
| 2015/0283761 | A1 | 10/2015 | Maeda et al. |
| 2016/0114432 | A1 | 4/2016 | Ferrar et al. |
| 2017/0021419 | A1 | 1/2017 | Ng et al. |
| 2017/0021454 | A1 | 1/2017 | Dallarosa et al. |
| 2017/0021455 | A1* | 1/2017 | Dallarosa ............ B33Y 10/00 |
| 2017/0036404 | A1 | 2/2017 | Rengers et al. |
| 2017/0144254 | A1 | 5/2017 | Buller et al. |
| 2017/0165751 | A1 | 6/2017 | Buller et al. |
| 2017/0330370 | A1* | 11/2017 | Kim ..................... G02B 26/123 |
| 2018/0257300 | A1 | 9/2018 | Ng et al. |
| 2018/0257301 | A1 | 9/2018 | Ng et al. |
| 2018/0339450 | A1 | 11/2018 | Franklin et al. |
| 2018/0339454 | A1 | 11/2018 | Franklin et al. |
| 2018/0369914 | A1 | 12/2018 | Ishikawa et al. |
| 2018/0369960 | A1 | 12/2018 | Ishikawa et al. |

FOREIGN PATENT DOCUMENTS

| | | |
|---|---|---|
| JP | 2009-006509 | 1/2009 |
| KR | 10-2003-0090042 | 11/2003 |
| KR | 10-2006-0012398 | 2/2006 |
| KR | 10-1612254 | 4/2016 |
| KR | 10-2016-0057568 | 5/2016 |
| KR | 10-2016-0109866 | 9/2016 |
| KR | 10-1682087 | 12/2016 |
| WO | WO 2009/026520 | 2/2009 |
| WO | WO 2016/026706 | 2/2016 |
| WO | WO 2016/051163 | 4/2016 |

OTHER PUBLICATIONS

International Search Report and Written Opinion in International Application No. PCT/US2018/021760, dated Jun. 28, 2018, 12 pages.

* cited by examiner

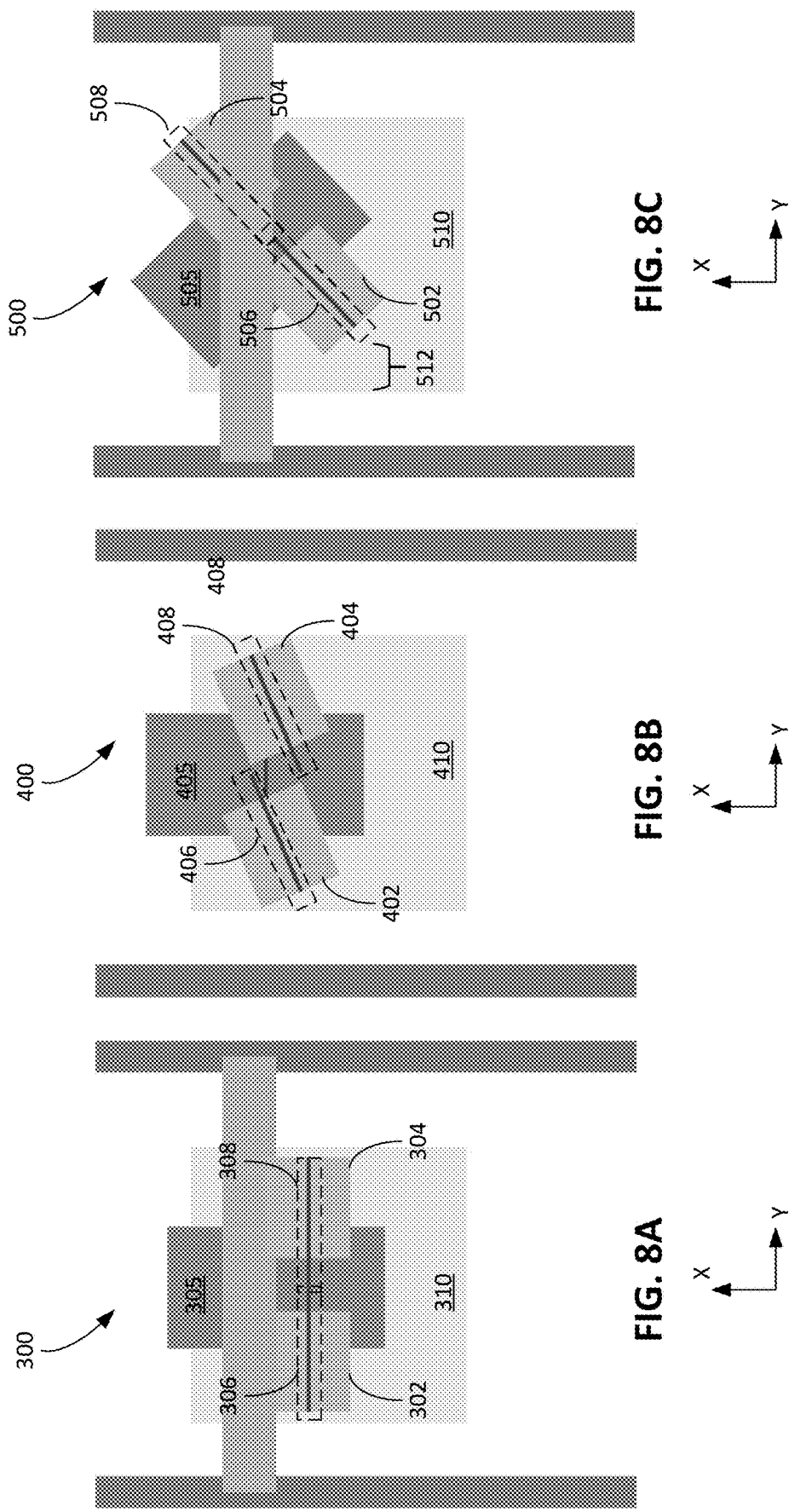

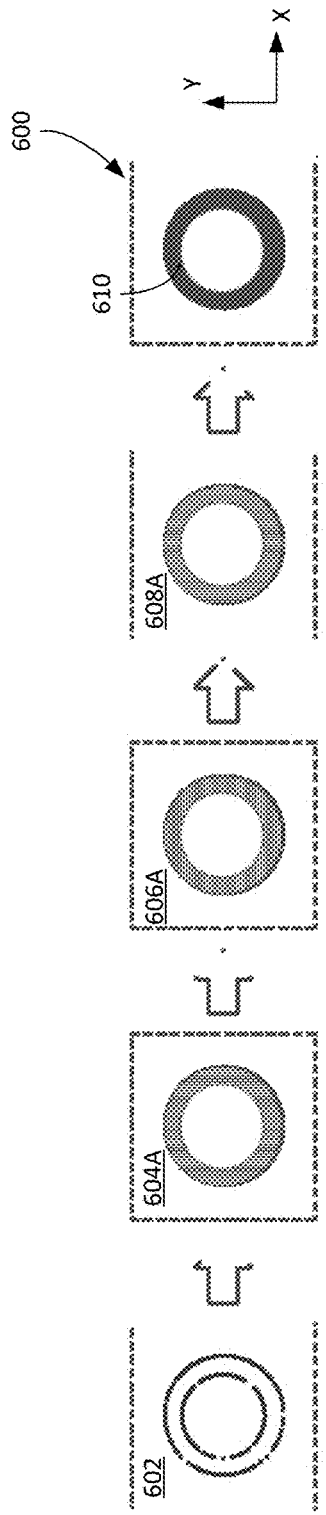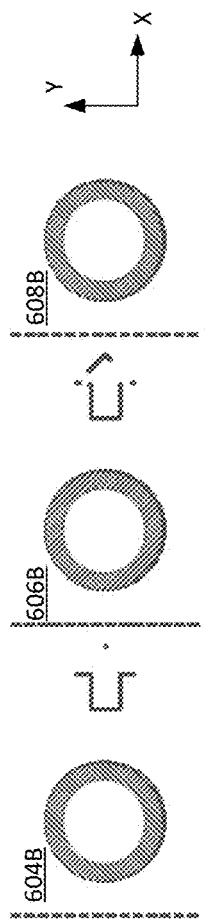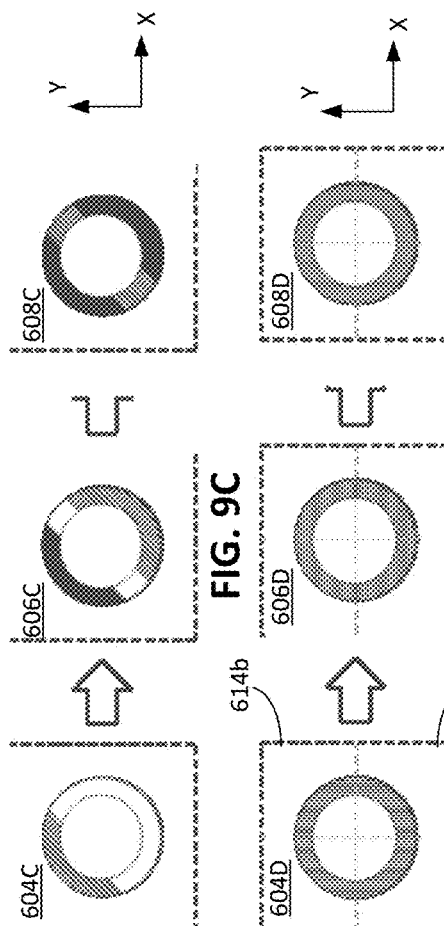
FIG. 9A
FIG. 9B
FIG. 9C
FIG. 9D

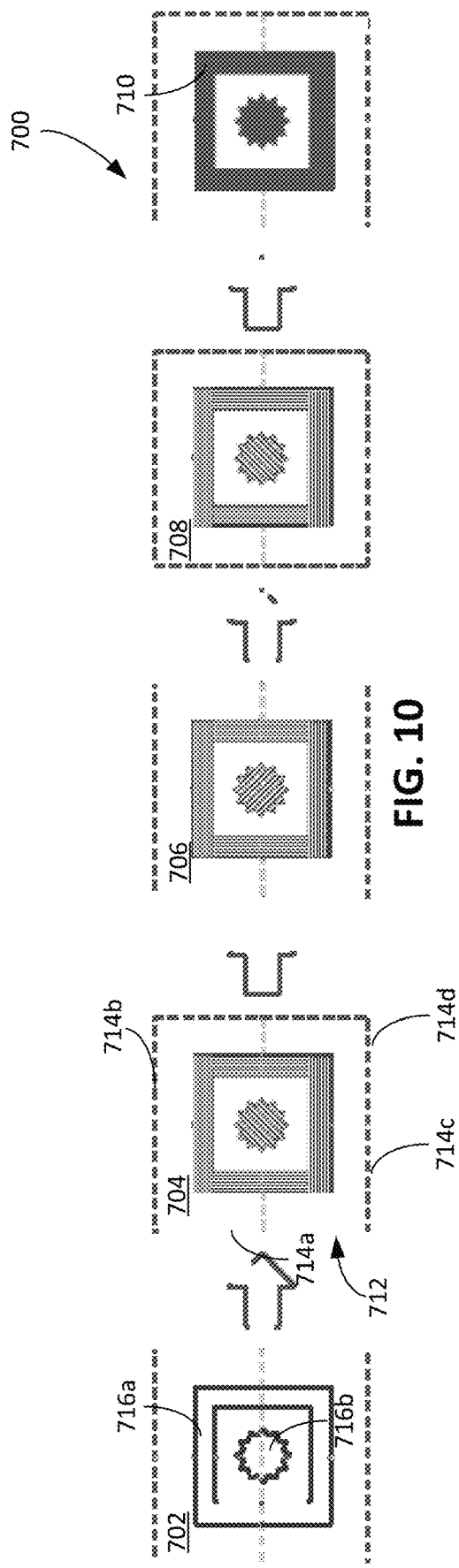

ADDITIVE MANUFACTURING WITH ENERGY DELIVERY SYSTEM HAVING ROTATING POLYGON AND SECOND REFLECTIVE MEMBER

CROSS-REFERENCE TO RELATED APPLICATIONS

This application claims priority to U.S. Provisional Application Ser. No. 62/469,466, filed on Mar. 9, 2017, the entire disclosure of which is incorporated by reference.

TECHNICAL FIELD

This specification relates to an energy delivery system for additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the materials that are compatible for use in the processes.

Conventional systems use an energy source for sintering or melting a powdered material. Once all the selected locations on the first layer are sintered or melted and then re-solidified, a new layer of powdered material is deposited on top of the completed layer, and the process is repeated layer by layer until the desired object is produced.

SUMMARY

In one aspect, an additive manufacturing apparatus includes a platform, a dispenser to dispense a plurality of layers of feed material on a top surface of the platform, and an energy delivery system. The energy delivery system includes a light source to emit a light beam, and a reflective member that has a plurality of reflective facets. The reflective member is positioned in a path of the light beam to receive the light beam and redirect the light beam toward the top surface of the platform to deliver energy to an uppermost layer of the layers of feed material to fuse the feed material. The reflective member is rotatable such that sequential facets sweep the light beam sequentially along a path on the uppermost layer.

In another aspect, a method of additive manufacturing includes dispensing a plurality of layers of feed material on a top surface of a platform, rotating a polygonal mirror that has a plurality of reflective facets, directing a light beam from a light source to the polygonal mirror and reflecting the light beam from the mirror to deliver energy to an uppermost layer of the layers of feed material to fuse the feed material. Rotation of the polygonal mirror causes sequential facets of plurality of facets to sweep the light beam sequentially along a path on the uppermost layer.

Implementations of the aspects may include one or more of the following features.

The light source may be a laser configured to emit the light beam toward the reflective member. The reflective facets may have substantially equal lengths. The reflective member may include between 4 to 30 facets. The reflective member may be a polygon mirror defining a regular convex polygon. The path on the uppermost layer may be a line on the uppermost layer. The line may extend across an entire width of a feed material delivery area on the platform.

An actuator may be operably connected to the reflective member. The actuator may be configured to continuously rotate the reflective member, e.g., at a constant velocity between 10 and 500 rpm, to sweep the light beam along the path.

The reflective member may be mounted on a support. The support may be movable in a horizontal direction that is at a non-zero angle relative to the path such that movement of the support positions the path at successive locations on the uppermost layer along the horizontal direction. The horizontal direction may be perpendicular to the path. The dispenser may be mounted on the support so as to be moveable with and in fixed position relative to the support to dispense a plurality of layers of feed material on a top surface of the platform. The dispenser may be configured to deliver feed material along a line substantially parallel to the path.

A conveyer may move the platform relative to the energy delivery system such that the light beam is delivered along a profile along a horizontal direction that is at a non-zero angle relative to the path such that movement of the platform positions the path at successive locations on the uppermost layer along the horizontal direction. The horizontal direction may be perpendicular to the path.

A controller may be configured to store data in a non-transitory computer readable medium, the data defining a pattern, and the controller may be configured to selectively operate the light source to deliver energy to the uppermost layer in the pattern defined by the data while the reflective member is continuously rotated.

The reflective member may be mounted on a support. The support and the platform may be movable relative to the energy delivery system, and the pattern may include a set of parallel of lines each at a non-zero angle to the horizontal axis. The set of parallel lines may be perpendicular to the horizontal axis. The controller may be configured to, in accordance to the pattern, operate the light source to deliver energy to a first sector of the uppermost layer, and then operate the light source to delivery energy to a second sector of the uppermost layer, the second sector having edges distinct from edges of the first sector. The controller may be configured to, in accordance to the pattern, operate the light source to deliver energy along a first line, and operate the light source to deliver energy along a second line at a non-zero angle to the first line. The controller may be configured to cause the light source to pulse while the reflective member is rotated such that energy is delivered to a discontinuous set of voxels along a first horizontal direction.

In another aspect, an additive manufacturing apparatus includes a platform, a dispenser to dispense a plurality of layers of feed material on a top surface of the platform, and an energy delivery assembly. The energy delivery assembly includes a light source to emit one or more light beams, a first reflective member having a plurality of reflective facets, and at least one second reflective member. The first reflective member is positioned in a path of at least one of the light beams to receive the at least one light beam and redirect the light beam toward the top surface of the platform to deliver energy to an uppermost layer of the layers of feed material to fuse the feed material. The first reflective member is rotatable such that sequential facets sweep the light beam sequentially along a path on the uppermost layer. The at least one second reflective member includes at least one second reflective surface positioned in a path of at least one of the light beams to receive the at least one light beam. The at least one second reflective member is movable such that the at least one second reflective surface is repositionable to receive at least one of the at least one light beam and redirect the at least one of at least one light beam along a two-dimensional path on the uppermost layer.

Implementations of the aspects may include one or more of the following features.

The one or more light sources may be one or more lasers configured to emit the light beam toward the reflective member. The light source may include a first light source to generate a first light beam and a second light source to generate a second light beam. The first reflective member may be positioned in the path of the first light beam and the second reflective member may be positioned in the path of the second light beam.

The sequential facets may sweep the light beam sequentially along a linear path on the uppermost layer. The first reflective member may be a polygon mirror defining a regular convex polygon. The second reflective member may be a mirror galvanometer. The mirror galvanometer may include a first adjustable reflective surface to translate the light beam along a first direction and a second reflective surface to translate the light beam along a second direction perpendicular to the first direction. The second reflective member may include a first reflective surface movable to redirect the light beam along a first horizontal direction, and a second reflective surface movable to redirect the light beam along a second horizontal direction at a non-zero angle to the first horizontal direction.

A controller may be configured to store data in a non-transitory computer readable medium, the data defining a region of the uppermost layer to fuse. The controller may be configured to cause the first reflective member to deliver energy toward an interior of the region, and cause the second reflective member to deliver energy along a perimeter of the region. The energy delivery assembly may include a first energy delivery system including the first reflective member and a first light source, and a second energy delivery system including the second reflective member and a second light source.

In another aspect, an additive manufacturing apparatus includes a platform, a dispenser to dispense a plurality of layers of feed material on a top surface of the platform, a first energy delivery system, and a second energy delivery system. The first energy delivery system includes a first light source to emit a first light beam, and a first reflective member having a plurality of reflective facets. The first reflective member is positioned in a path of the first light beam to redirect the first light beam toward a first portion of top surface of the platform to deliver energy to a first region of an uppermost layer of the layers of feed material to fuse the feed material in the first region. The first reflective member is rotatable such that sequential facets sweep the first light beam sequentially along a linear first path on the uppermost layer. The second energy delivery system includes a second light source to emit a second light beam, and a second reflective member having a plurality of reflective facets. The second reflective member is positioned in a path of the second light beam to redirect the second beam toward a second portion of top surface of the platform to deliver energy to a second region of the uppermost layer of the layers of feed material to fuse the feed material in the second region. The second reflective member is rotatable such that sequential facets sweep the second light beam sequentially along a linear second path on the uppermost layer.

Implementations of the aspects may include one or more of the following features.

The first energy system and the second energy system may be mounted on a support that is movable relative to the platform along a first direction. The first direction may be at a non-zero angle relative to the linear first path and the linear second path. The first linear path and second linear path may be parallel. The first direction may be at a right angle to the linear first path and the linear second path. A combination of the first path and the second path may span a working area of the platform.

In another aspect, an additive manufacturing apparatus includes a platform, a dispenser to dispense a plurality of layers of feed material on a top surface of the platform, and an energy delivery assembly. The energy delivery assembly includes a light source to emit a light beam, a first reflective member having a plurality of reflective facets, and a second reflective member comprising at least one second reflective surface positioned in the path of the light beam. The first reflective member is positioned in a path of the light beams to receive the light beam and redirect the light beam toward the top surface of the platform to deliver energy to an uppermost layer of the layers of feed material to fuse the feed material. The first reflective member is rotatable such that sequential facets sweep the light beam sequentially along a linear path along a first direction on the uppermost layer. The second reflective member is movable so as to reposition the linear path along a second direction at a non-zero angle to the first direction.

Implementations of the aspects may include one or more of the following features.

The second reflective member may be positioned in the path of the light beam between the light source and the first reflective member. The first reflective member may be a polygon mirror defining a regular convex polygon. The second reflective member may be a mirror galvanometer.

In another aspect, an additive manufacturing apparatus includes a platform, a dispenser to dispense a plurality of layers of feed material on a top surface of the platform, an energy delivery system, and an actuator. The energy delivery system includes a light source to emit a light beam, and a reflective member having a plurality of reflective facets, the reflective member positionable in a path of the light beam to receive the light beam and redirect the light beam toward the top surface of the platform to deliver energy to an uppermost layer of the layers of feed material to fuse the feed material. The reflective member is rotatable such that sequential facets sweep the light beam sequentially along a linear path on the uppermost layer. The actuator is configured to adjust an angle of the linear path relative to the platform.

Implementations of the aspects may include one or more of the following features.

The platform may be rotatable, and the actuator may be coupled to the platform to rotate the platform to adjust to angle of the linear path relative to the platform.

The reflective member may be mounted on a rotatable support, and the reflective member is rotatable about a first axis, and the actuator is coupled to the support to rotate the support about a second axis to adjust the angle of the linear path relative to the platform.

A controller may be coupled to the energy deliver system and the actuator and may be configured to cause the reflective member to sweep the light beam sequentially along the linear path along a first direction during fusing of a first layer of the feed material, to activate the actuator to adjust the angle of the linear path, and to cause the reflective member to sweep the light beam sequentially along the linear path along a second direction at a non-zero angle relative to the first direction during fusing of a second layer of the feed material. The first direction may be perpendicular to the second direction. The energy delivery system may be mounted on a support that is movable relative to the platform along a third direction. The third direction may be at a non-zero angle relative to the first direction and the second direction.

A controller may be configured to selectively operate the light source while the reflective member is rotated such that the light beam is delivered to a first region of the uppermost layer and is not delivered to a second region of the uppermost layer, and selectively operate the light source while the reflective member is rotated such that the light beam is delivered to the second region of the uppermost layer and is not delivered to the first region of the uppermost layer.

In another aspect, an additive manufacturing apparatus includes a platform, a dispenser to dispense a plurality of layers of feed material on a top surface of the platform, an energy delivery system, an actuator, and a controller. The energy delivery system includes a light source to emit a light beam, and a reflective member having a plurality of reflective facets, the reflective member positionable in a path of the light beam to receive the light beam and redirect the light beam toward the top surface of the platform to deliver energy to an uppermost layer of the layers of feed material to fuse the feed material. The reflective member is rotatable such that sequential facets sweep the optical path for the light beam sequentially along a linear first path in a first direction on the uppermost layer. The actuator is configured to adjust a position of the linear path relative to the platform. The controller is coupled to the actuator and light source and configured to selectively operate the light source while the reflective member is continuously rotated such a region of impingement of the light beam extends along a second path formed by activation of the light beam, the second path extending in a second direction at a non-zero angle to the first direction.

Implementations of the aspects may include one or more of the following features.

The energy delivery system may be mounted on a support that is movable relative to the platform along a third direction at a non-zero angle to the first direction and the actuator is coupled to the support. The third direction may be perpendicular to the first direction.

A second reflective member comprising at least one second reflective surface may be positioned in the path of the light beam. The second reflective member may be movable by the actuator so as to reposition the linear path along a third direction at a non-zero angle to the first direction. The third direction is perpendicular to the first direction.

The controller may be configured to cause the region of impingement of the light beam to traverse a plurality of second paths, each second path offset along a fourth direction perpendicular to the second direction. The plurality of second paths fill a region on the uppermost layer to fuse the region. During a first scan period, sequential adjacent ones of the plurality of second paths are separated in the fourth direction by at least one voxel. The controller may be configured to selectively operate the light source such that each second path extends in the second direction during fusing of a first layer of the feed material, and to selectively operate the light source such that each second path extends in the fifth direction at a non-zero angle relative to the second direction during fusing of a second layer of the feed material.

In another aspect, a method of additive manufacturing includes dispensing a plurality of layers of feed material on a top surface of a platform, rotating a polygonal mirror that has a plurality of reflective facets, directing a light beam from a light source to the polygonal mirror and reflecting the light beam from the mirror to deliver energy to an uppermost layer of the layers of feed material to fuse the feed material, and selectively operating the light source. Rotation of the polygonal mirror causes sequential facets of plurality of facets to sweep an optical path of the light beam sequentially along a linear first path in a first direction on the uppermost layer. The light source is selectively operated while the polygonal mirror is continuously rotated such that a region of impingement of the light beam on the outermost layer caused by activation of the light beam traverses a linear second path, the second path extending in a second direction at a non-zero angle to the first direction.

Implementations of the aspects may include one or more of the following features.

The region of impingement of the light beam may traverse a plurality of second paths, each second path offset along a fourth direction perpendicular to the second direction. The plurality of second paths may fill a region on the uppermost layer to fuse the region. The light source may be selectively operated such that second path extends in the second direction during fusing of a first layer of the feed material, and selectively operated such that second path extends in a third direction at a non-zero angle relative to the second direction during fusing of a second layer of the feed material.

Advantages of the foregoing may include, but are not limited to, the following. An energy delivery system in accordance with the foregoing may deliver energy more uniformly to different portions of an uppermost layer of feed material. In particular, the dwell time of the light beam delivered by the energy delivery system to each voxel across the layer can be more uniform. This can prevent energy delivered by the energy delivery system from being concentrated in a particular region of the layer of feed material due to delay required for acceleration and deceleration of the reflective member.

In some cases, the energy delivery system can deliver the energy more evenly across the uppermost layer of feed material than energy delivery systems that rely on acceleration and deceleration of a reflective member to deliver energy to different portion of the uppermost layer of feed material. The energy delivery system can reduce energy delivery variation caused by changes in motion of members of the energy delivery system that redirect light beams toward a platform of the additive manufacturing apparatus. For example, the energy delivery system can deliver energy consistently to outer surfaces of objects to be formed by the additive manufacturing apparatus and interior of the objects to be formed. As a result, the surfaces of the objects can have fewer surface deformations than objects formed by additive manufacturing apparatuses that deliver energy in a process that includes longer dwell times to form surfaces of the objects. Furthermore, fewer post-processing operations are necessary to achieve a desired surface quality of the object to be formed.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIGS. 8A-8C are schematic top views of further examples of additive manufacturing apparatuses each including multiple energy delivery systems.

FIGS. 9A-9D and 10 illustrate examples of processes to deliver energy to a platform using different patterns of energy delivery.

Like reference numbers and designations in the various drawings indicate like elements.

DETAILED DESCRIPTION

In many additive manufacturing processes, energy is selectively delivered to a layer of feed material dispensed by an additive manufacturing apparatus to fuse the feed material in a pattern, thereby forming a portion of an object. For example, a laser beam can be reflected off two galvo-driven mirrors whose positions are controlled to drive the laser beam in a vector-scan manner across the layer of feed material in which the laser beam traces a vector path in a continuous manner. Because the reflective members need to be accelerated and decelerated to control location of the laser beam, the dwell time of the laser beam might not be uniform across the layer.

However, a reflective member that continuously rotates in a single direction can be used in conjunction with modulation of the light beam to control where the energy is delivered. The continuous motion of the reflective member can reduce the number of delays required for scanning the light beam across the feed material, thus improving the throughput of objects formed by an additive manufacturing apparatus including the energy delivery system.

Furthermore, the object to be formed can have improved surface quality when energy delivered to the feed material is more consistently distributed. By delivering the light beam through components that move at constant velocities, e.g., constant rotational velocity, with minimal acceleration and deceleration, the energy delivery system can improve uniformity of the dwell time of the light beam. This can reduce the likelihood of inconsistent energy distribution.

Example Additive Manufacturing Apparatuses

Figure 1A:
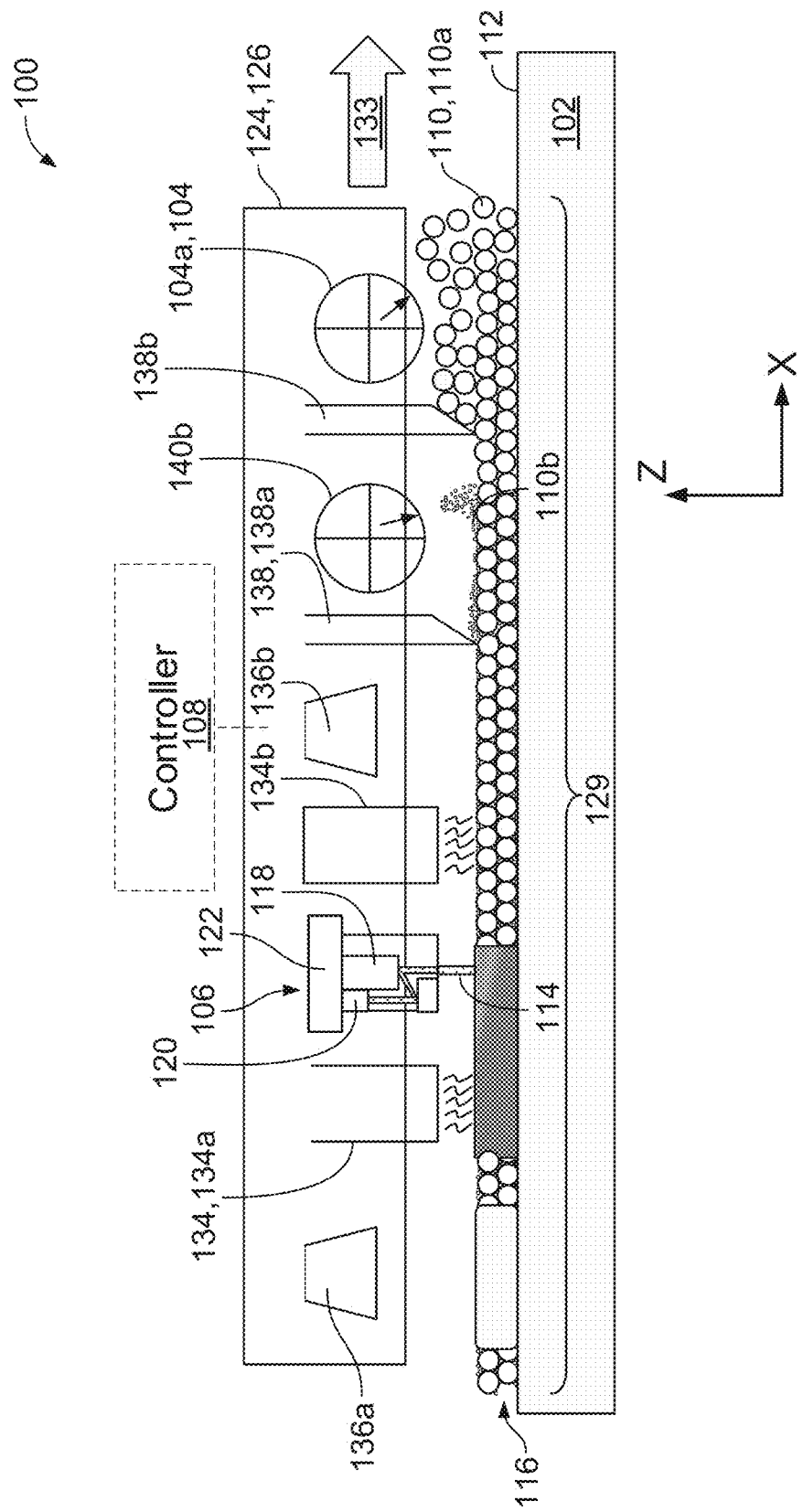
FIGS. 1A and 1B are schematic side and top views of an example of an additive manufacturing apparatus.
Figure 1B:
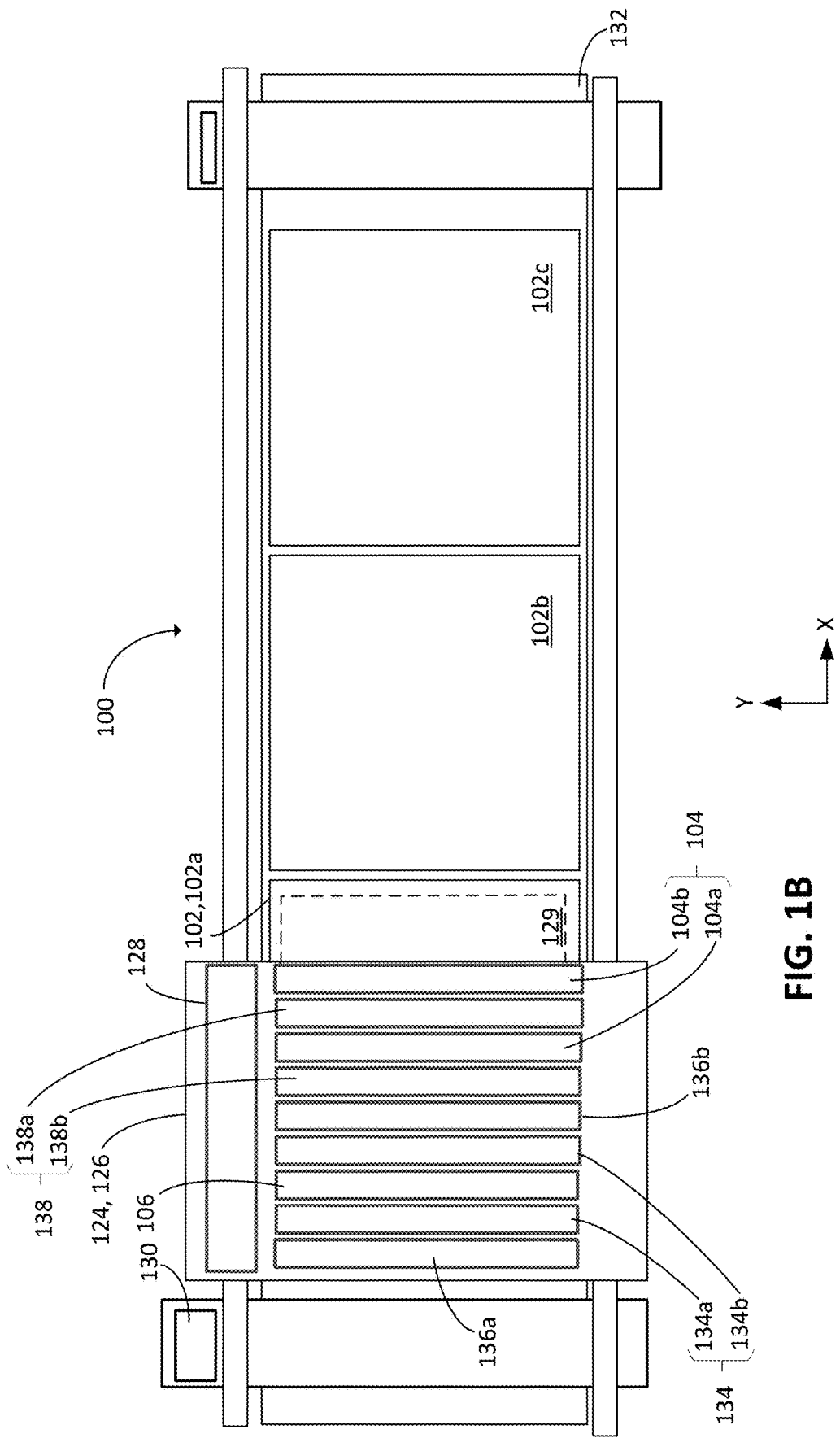

Referring to FIGS. 1A and 1B, an example of an additive manufacturing apparatus 100 includes a platform 102, a dispenser 104, an energy delivery system 106, and a controller 108. During an operation to form an object, the dispenser 104 dispenses successive layers of feed material 110 on a top surface 112 of the platform 102. The energy delivery system 106 emits a light beam 114 to deliver energy to an uppermost layer 116 of the layers of feed material 110, thereby causing the feed material 110 to be fused, for example, in a desired pattern to form the object. The controller 108 operates the dispenser 104 and the energy delivery system 106 to control dispensing of the feed material 110 and to control delivery of the energy to the layers of feed material 110. The successive delivery of feed material and fusing of feed material in each of the successively delivered layers result in formation of the object.

The dispenser 104 can include a flat blade or paddle to push a feed material from a feed material reservoir across the platform 102. In such an implementation, the feed material reservoir can also include a feed platform positioned adjacent the build platform 102. The feed platform can be elevated to raise some feed material above the level of the build platform 102, and the blade can push the feed material from the feed platform onto the build platform 102.

Alternatively or in addition, the dispenser can be suspended above the platform 102 and have one or more apertures or nozzles through which the powder flows. For example, the powder could flow under gravity, or be ejected, e.g., by piezoelectric actuator. Control of dispensing of individual apertures or nozzles could be provided by pneumatic valves, microelectromechanical systems (MEMS) valves, solenoid valves, and/or magnetic valves. Other systems that can be used to dispense powder include a roller having apertures, and an auger inside a tube having a plurality of apertures.

The feed material 110 can include metallic particles. Examples of metallic particles include metals, alloys and intermetallic alloys. Examples of materials for the metallic particles include aluminum, titanium, stainless steel, nickel, cobalt, chromium, vanadium, and various alloys or intermetallic alloys of these metals.

The feed material 110 can include ceramic particles. Examples of ceramic materials include metal oxide, such as ceria, alumina, silica, aluminum nitride, silicon nitride, silicon carbide, or a combination of these materials, such as an aluminum alloy powder.

The feed material can be dry powders or powders in liquid suspension, or a slurry suspension of a material. For example, for a dispenser that uses a piezoelectric printhead, the feed material would typically be particles in a liquid suspension. For example, a dispenser could deliver the powder in a carrier fluid, e.g. a high vapor pressure carrier, e.g., Isopropyl Alcohol (IPA), ethanol, or N-Methyl-2-pyrrolidone (NMP), to form the layers of powder material. The carrier fluid can evaporate prior to the sintering step for the layer. Alternatively, a dry dispensing mechanism, e.g., an array of nozzles assisted by ultrasonic agitation and pressurized inert gas, can be employed to dispense the first particles.

As described herein with respect to FIGS. 2 and 3A-3C, the energy delivery system 106 includes a light source 120 to emit a light beam 114. The energy delivery system 106 further includes a reflective member 118 that is rotatable and that redirects the light beam 114 toward the uppermost layer 116. The reflective member 118 is rotatable to sweep the light beam 114 along a path, e.g., a linear path, on the uppermost layer 116. In conjunction with relative motion of the energy delivery system 106 and the platform 102, or deflection of the light beam 114 by another reflector, e.g., a galvo-driven mirror, a sequence of sweeps along the path by the light beam 114 can create a raster scan of the light beam 114 across the uppermost layer 116.

As the light beam 114 sweeps along the path, the light beam 114 is modulated, e.g., by causing the light source 120 to turn the light beam 114 on and off, in order to deliver energy to selected regions of the layers of feed material 110 and fuse the material in the selected regions to form the object in accordance to the desired pattern.

In some implementations, the light source 120 includes a laser configured to emit the light beam 114 toward the reflective member 118. The reflective member 118 is positionable in a path of the light beam 114 emitted by the light source 120 such that a reflective surface of the reflective member 118 receives the light beam 114. The reflective member 118 then redirects the light beam 114 toward the top surface of the platform 102 to deliver energy to an uppermost layer 116 of the layers of feed material 110 to fuse the feed material 110. For example, the reflective surface of the reflective member 118 reflects the light beam 114 to redirect the light beam 114 toward the platform 102.

In some implementations, the energy delivery system 106 is mounted to a support 122 that supports the energy delivery system 106 above the platform 102. In some cases, the support 122 (and the energy delivery system 106 mounted on the support 122) is rotatable relative to the platform 102. In some implementations, the support 122 is mounted to another support 124 arranged above the platform 102. The support 124 can be a gantry that supports the energy delivery and dispensing systems of the additive manufacturing apparatus 100 above the platform 102.

In some cases, the support 122 is rotatably mounted on the support 124. The reflective member 118 is rotated when the support 122 is rotated, e.g., relative to the support 124, thus reorienting the path of the light beam 114 on the uppermost layer 116. For example, the energy delivery system 106 can be rotatable about an axis extending vertically away from the platform 102, e.g., an axis parallel to the Z-axis, between the Z-axis and the X-axis, and/or between the Z-axis and the Y-axis. Such rotation can change the azimuthal direction of the path of the light beam 114 along the X-Y plane, i.e., across the uppermost layer 116 of feed material.

A printhead 126 can include the support 122. The printhead 126 is arranged above the platform 102 and is repositionable along one or more horizontal directions relative to the platform 102. The various systems mounted to the printhead 126 can be modular systems whose horizontal position above the platform 102 is controlled by a horizontal position of the printhead 126 relative to the platform 102. For example, the printhead 126 can be mounted to the support 124, and the support 124 can be movable to reposition the printhead 126.

In some implementations, an actuator system 128 includes one or more actuators engaged to the systems mounted to the printhead 126. In some implementations, the printhead 126 and the constituent systems do not span the operating width of the platform 102. In this case, the actuator system 128 is operable to drive the system across the support 124 such that the printhead 126 and each of the systems mounted to the printhead 126 are movable along the Y-axis. In some implementations (shown in FIG. 1B), the printhead 126 and the constituent systems span the operating width of the platform 102, and motion along the Y-axis is not necessary.

For movement along the X-axis, in some cases, the apparatus 100 further includes an actuator 130 configured to drive the printhead 126 and the support 124 in their entireties relative to the platform 102 along the X-axis. Alternatively or additionally, the apparatus 100 includes a conveyor 132 on which the platform 102 is located. The conveyor 132 is driven to move the platform 102 along the X-axis relative to the printhead 126.

The actuator 130 and/or the conveyor 132 causes relative motion between the platform 102 and the support 124 such that the support 124 advances in a forward direction 133 relative to the platform 102. The dispenser 104 can be positioned along the support 124 ahead of the energy delivery system 106 so that feed material 110 can be first dispensed, and the recently dispensed feed material can then be cured by energy delivered by the energy delivery system 106 as the support 124 is advanced relative to the platform 102. The dispenser can be configured to deliver feed material along a line that spans the platform 102. As shown in FIG. 1B, the dispense 104 can extend, e.g., along the Y-axis, such that the feed material is dispensed along a line, e.g., along the Y-axis, that is perpendicular to the direction of motion of the support 124, e.g., perpendicular to the X-axis. Thus, as the support 124 advances along, feed material can be delivered across the entire platform 102.

In some cases, the platform 102 is one of multiple platforms 102a, 102b, 102c. Relative motion of the support 124 and the platforms 102a-102c enables the systems of the printhead 126 to be repositioned above any of the platforms 102a-102c, thereby allowing feed material to be dispensed and fused on each of the platforms 102a-102c to form multiple objects.

In some implementations, the additive manufacturing apparatus 100 includes a bulk energy delivery system 134. For example, in contrast to delivery of energy by the energy delivery system 106 along a path on the uppermost layer 116 of feed material, the bulk energy delivery system 134 delivers energy to a predefined area of the uppermost layer 116. The bulk energy delivery system 134 can include a heating lamp that, when activated, delivers the energy to the predefined area within the uppermost layer 116 of feed material 110.

The bulk energy delivery system 134 is arranged ahead of or behind the energy delivery system 106, e.g., relative to the forward direction 133. The bulk energy delivery system 134 can be arranged ahead of the energy delivery system 106, for example, to deliver energy immediately after the feed material 110 is dispensed by the dispenser 104. This initial delivery of energy by the bulk energy delivery system 134 can stabilize the feed material 110 prior to delivery of energy by the energy delivery system 106 to fuse the feed material 110 to form the object.

Alternatively, the bulk energy delivery system 134 can be arranged behind the energy delivery system 106, for example, to deliver energy immediately after the energy delivery system 106 delivers energy to the feed material 110. This subsequent delivery of energy by the bulk energy delivery system 134 can control the cool-down temperature profile of the feed material, thus providing improved uniformity of curing. In some cases, the bulk energy delivery system 134 is a first of multiple bulk energy delivery systems 134a, 134b, with the bulk energy delivery system 134a being arranged behind the energy delivery system 106 and the bulk energy delivery system 134b being arranged ahead of the energy delivery system 106.

Optionally, the apparatus 100 includes a first sensing system 136a and/or a second sensing system 136b to detect properties, e.g., temperature, density, and material, of the layer 116 as well as powder dispensed by the dispenser 104. The controller 108 can coordinate the operations of the energy delivery system 106, the dispenser 104, and, if present, any other systems of the apparatus 100. In some cases, the controller 108 can receive user input signal on a user interface of the apparatus or sensing signals from the sensing systems 136a, 136b of the apparatus 100, and control the energy delivery system 106 and the dispenser 104 based on these signals.

Optionally, the apparatus 100 can also include a spreader 138, e.g., a roller or blade, that cooperates with first the dispenser 104 to compact and/or spread feed material 110 dispensed by the dispenser 104. The spreader 138 can provide the layer with a substantially uniform thickness. In some cases, the spreader 138 can press on the layer of feed material 110 to compact the feed material 110. The spreader 138 can be supported by the support 124, e.g., on the printhead 126, or can be supported separately from the printhead 126.

In some implementations, the dispenser 104 includes multiple dispensers 104a, 104b, and the feed material 110 includes multiple types of feed material 110a, 110b. A first dispenser 104a dispenses the first feed material 110a, while a second dispenser 104b dispenses the second feed material 110b. If present, the second dispenser 104b enables delivery of a second feed material 110b having properties that differ from those of the first feed material 110a. For example, the first feed material 110a and the second feed material 110b can differ in material composition or average particle size.

In some implementations, the particles of the first feed material 110a can have a larger mean diameter than the particles of the second feed material 110b, e.g., by a factor of two or more. When the second feed material 110b is dispensed on a layer of the first feed material 110a, the second feed material 110b infiltrates the layer of first feed material 110a to fill voids between particles of the first feed material 110a. The second feed material 110b, having a smaller particle size than the first feed material 110a, can achieve a higher resolution.

In some cases, the spreader 138 includes multiple spreaders 138a, 138b, with the first spreader 138a being operable with the first dispenser 104a to spread and compact the first feed material 110a and the second spreader 138b being operable with the second dispenser 104b to spread and compact the second feed material 110b.

Figure 2:
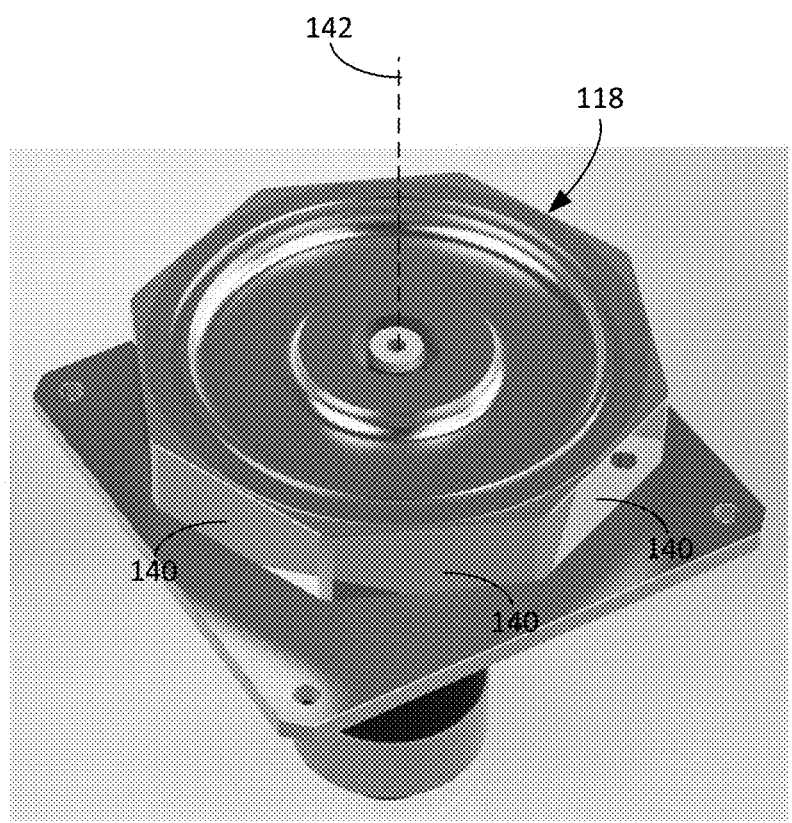
FIG. 2 is a perspective view of a reflective member.

Referring to FIG. 2, the reflective member 118 has multiple reflective facets 140 each having a reflective surface that reflects received light, e.g., the light beam 114. The reflective member 118 includes a polygonal mirror. The reflective facets 140 define a corresponding segments of the polygon, with the reflective facets 140 being joined at vertices of the polygon (e.g., vertices 148a, 148b in FIGS. 3A-3C). In this regard, each of the reflective facets 140 form a continuous loop about an axis of rotation 142 of the reflective member 118. As a result, rotation of the reflective member 118 about the axis of rotation 142 enables different reflective surfaces, e.g., the reflective facets 140, to sequentially receive the light beam 114.

The reflective surfaces of the reflective facets 140, in some examples, are substantially planar surfaces. In this case, the reflective facets 140 define a regular convex polygon. In some implementations, the reflective surfaces are convex or concave. In this case, the reflective facets 140 can define a Reuleaux polygon having sides of constant curvature, e.g., concave or convex curvature. The reflective facets 140 have substantially equal lengths. For example, each of the reflective facets 140 has a length between 20 and 60 mm. The number of reflective facets 140 is between, for example, four and thirty.

Figure 3:
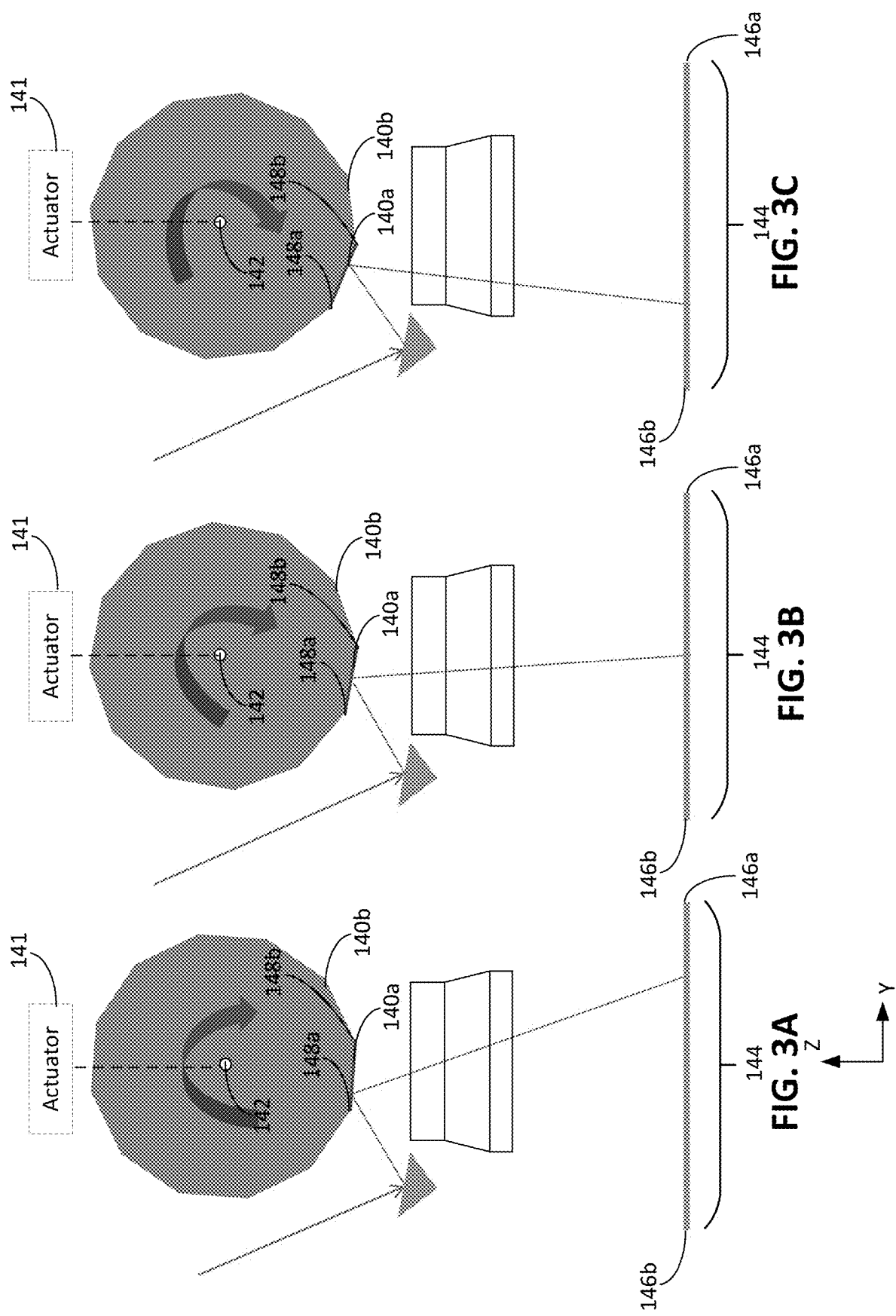
FIGS. 3A-3C illustrate a process of scanning a light beam across a platform.

Referring to FIGS. 3A-3C, the location at which the light beam 114 is incident on a reflective facet of the reflective member 118 varies with rotation of the reflective member 118 about the axis of rotation 142. The axis of rotation 142, in some cases, is parallel to the X-axis. The reflective member 118, when rotated about the axis of rotation 142, can spin without a change in a location along the X-axis or along the Y-axis relative to the support 122.

The relative positions and dimensions of the reflective member 118, in conjunction with projection optics, can be such rotation of the member 118 causes each facet 140 to sweep the light beam 114 across an entire width of the feed material delivery area 129, e.g., along the Y-axis. For example, if the reflective facet 140 defines a segment of a regular convex polygon, as the spot where the light beam 114 impinges the facet 140 moves from one vertex to the other vertex, the light beam 114 is swept along a path on the uppermost layer 116 from one end 146a of a region 144 of the feed material delivery area 129 to another end 146b of the region 144 of the feed material delivery area 129, e.g., along the Y-axis.

In some cases, the region extends across the entire width of the feed material delivery area 129. Alternatively, as described herein, the region extends across a portion of the width of the feed material delivery area 129. The reflective member 118 can be repositioned to enable the energy to be delivered across the entire width of the feed material delivery area 129.

In some examples, the energy delivery system 106 includes a rotary actuator 141 operably connected to the reflective member 118. The actuator 141 is driven to rotate the reflective member 118 about the axis of rotation 142.

The controller 108 can be configured to cause the actuator 141 to rotate continuously during processing of a layer of the feed material. Thus, the reflective member 118 repeatedly sweeps the light beam 114 along the path on the uppermost layer 116 of feed material 110. The actuator 141 is configured to rotate the reflective member 118 at a constant velocity between 10 and 500 rpm (depending on the diameter and the number of facets of the polygon). The actuator 141 can rotate at a rate that allows the light beam 114 to sweep across one reflective facet 140 in 1 to 500 milliseconds.

Figure 4:
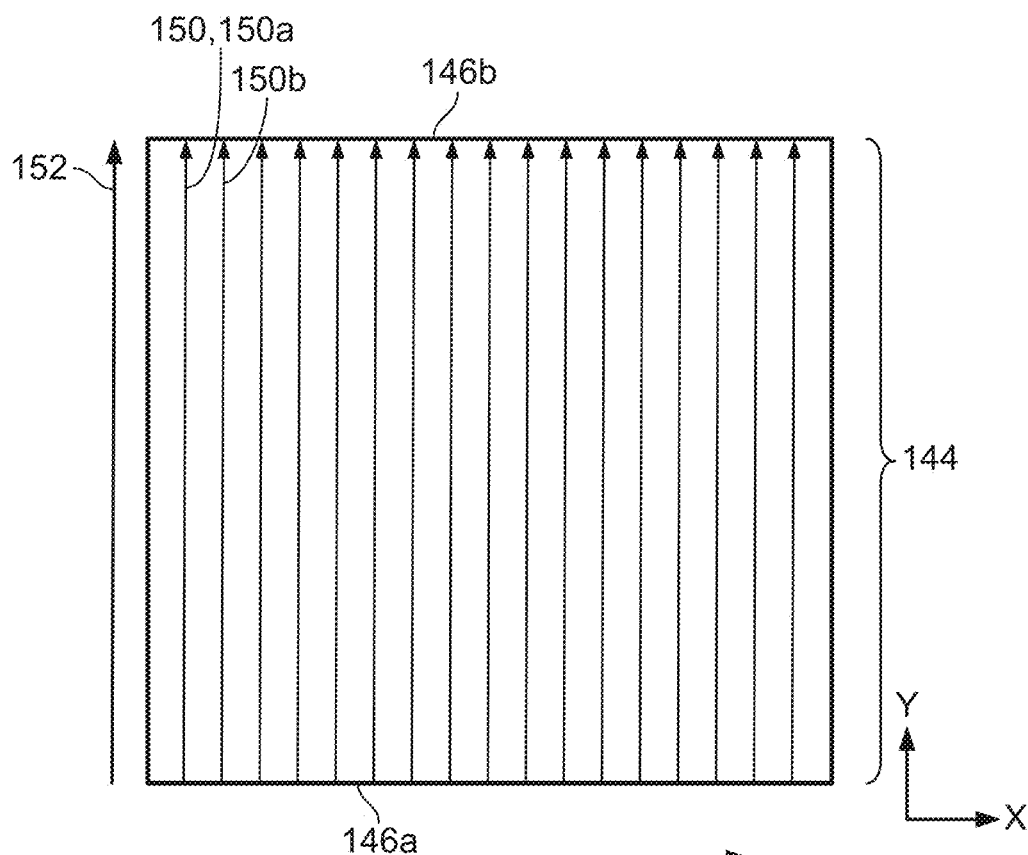
FIG. 4 is a top view of a platform overlaid with a scanning pattern of a light beam.

Referring to FIG. 4, in some implementations, between sequential reflective facets 140a, 140b, the reflective member 118 is advanced relative to the platform 102, e.g., along the X-axis. As a result, the light beam 114 is swept along a first path 150a on the uppermost layer 116 when the light beam 114 is swept across the first reflective facet 140a, and the light beam 114 is swept along a second path 150b when the light beam 114 is swept across the second reflective facet 140b. The paths 150a, 150b can be parallel. The second path 150b of the light beam 114 is offset along the X-axis from the first path 150a of the light beam 114. Each reflective facet 140 can thus sweep along a unique path within the region 144 above the platform 102 to fuse different portions of the dispensed feed material 110.

As the actuator 141 is rotated, the light beam 114 scans across in a first horizontal direction, e.g., a scanning direction 152. For example, the reflective member 118 is continuously advanced relative to the platform 102 along the X-axis as the reflective member 118 is rotated. As a result, the path 150a, 150b can be parallel and can be angled relative to Y-axis due to the motion of the reflective member 118 relative to the platform 102 in the forward direction 133. The reflective member 118 can be rotated relative to the platform 102, e.g., through rotation of the support 122, to compensate for any angle of the path 150a, 150b relative to the X-axis.

In some implementations, the actuator 130 is operated to advance the support 122 and thereby to advance the reflective member 118 in the forward direction 133. The support 122 is movable in a horizontal direction, e.g., the forward direction 133, that is at a non-zero angle relative to a path 150 swept by the light beam 114. In some cases, the forward direction 133 is perpendicular to the path 150. Alternatively, the forward direction 133 forms an angle with the path 150 that is less than 90 degrees. The angle can be greater than 45 degrees. While described as being advanced through operation of the actuator 130, in some cases, the reflective member 118 is advanced relative to the platform 102 (and hence relative to the region 144) through operation of the conveyor 132.

In some implementations, a path 150 of the light beam 114 swept along the uppermost layer 116 of feed material 110 forms a line, e.g., a straight line, on the uppermost layer 116. The path 150, for example, includes a continuous line spanning from the first end 146a to the second end 146b of the region 144. If the region 144 corresponds to the feed material delivery area 129, the line can extend across an entire width of the feed material delivery area 129 on the platform 102.

Figures 5A, 5B:
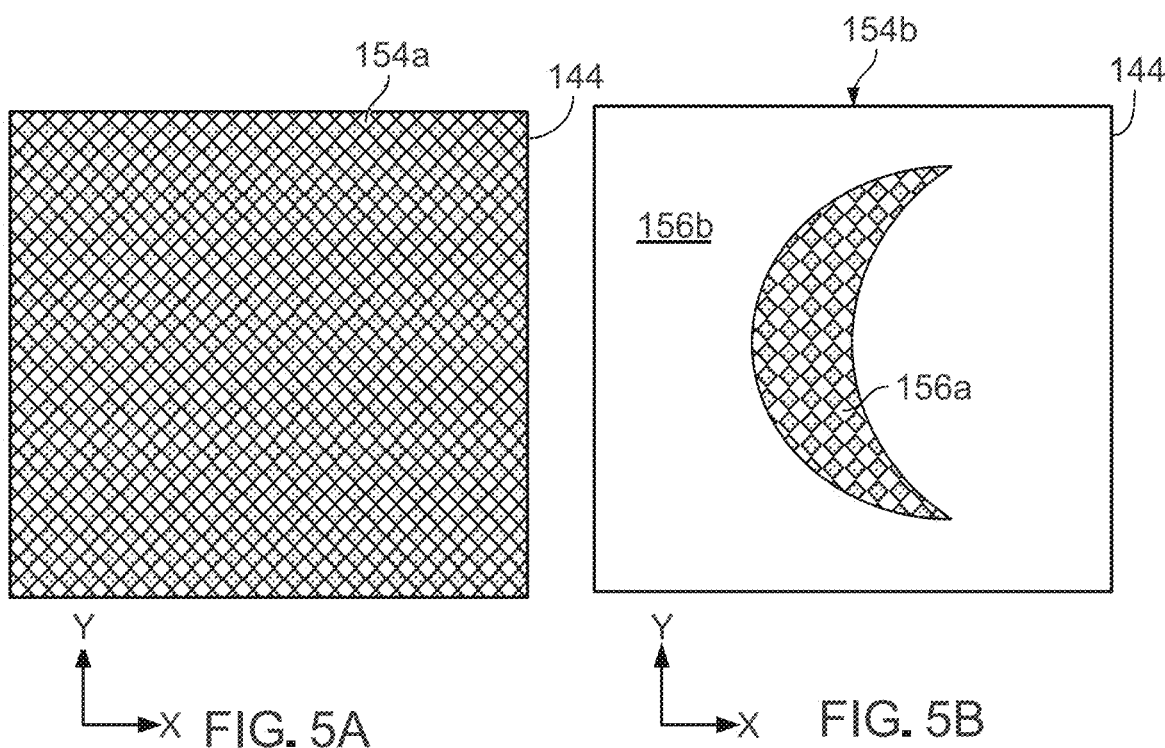
FIGS. 5A and 5B are top views of platforms overlaid with example patterns of energy delivered to the platforms.

Referring to FIG. 5A, the rotation of the reflective member 118 in combination with the translation of the reflective member 118 relative to the platform 102 enables the light beam 114 to be directed across the entirety of the region 144. In some cases, the light source 120 can be selectively operated and the light beam 114 can be scanned to generate patterns of light beam coverage spanning over a portion of the region 144. The controller 108 can receive and/or store data in a non-transitory computer readable medium, with the data defining a pattern of light beam coverage.

In some cases, a pattern 154a defined by the data covers the entirety of the region 144. The controller 108 can continuously operate the light source 120 such that the light beam 114 is swept along a continuous line extending across the entire region 144, e.g., across an entire width of the region 144 in the scanning direction 152. The energy delivery system 106 can be advanced as the light beam 114 is swept across the platform 102 so that the light beam 114 can cover the entirety of the region 144 by being scanned across the region 144 in accordance to the pattern 154a.

Alternatively, referring to FIG. 5B, a pattern 154b defined by the data covers a portion of the region 144. The pattern 154b can cover a portion of a length of the region 144 extending in the forward direction 133 and can also cover a portion of the width of the region 144 extending in the scanning direction 152. Rather than controlling the actuator 141 to control the coverage of the light beam 114 along the width of the region 144, the controller 108 can selectively activate the light source 120 such that the light beam 114 is only generated when the reflective member 118 is oriented to direct the light beam 114 toward a first area 156a of the region 144. Accordingly, the light beam 114 is not generated when the reflective member 118 is oriented not to direct the light beam 114 toward the first area 156a of the region 144, e.g., oriented to direct the light beam 114 toward a second area 156b of the region 144. Energy is thus delivered to the area 156a but is not delivered to the area 156b.

The actuator 141 is operated to continuously rotate the reflective member 118 during this process of selectively activating the light source 120 such that, when the light beam 114 is being directed toward the region 144, the dwell time of the light beam 114 is uniform along the path, e.g., along the Y-axis. Similarly, the actuator 130 can be operated to translate the energy delivery system 106 relative to the platform 102 during this process of selectively activating the light source 120 such that the dwell time of the light beam 114 is uniform along the forward direction 133, e.g., along the X-axis.

Non-uniform dwell time can cause poor surface quality of the object to be formed, and can occur due to, for example, a reduction in speed of the reflective member 118 or a reversal in direction of rotation of the reflective member 118. However, because the reflective member 118 is continuously rotated, such dwelling of the light beam 114 can be avoided. In some cases, the light beam 114 can be selectively activated, e.g., pulsated, to selectively cure voxels of the feed material.

Figure 6A:
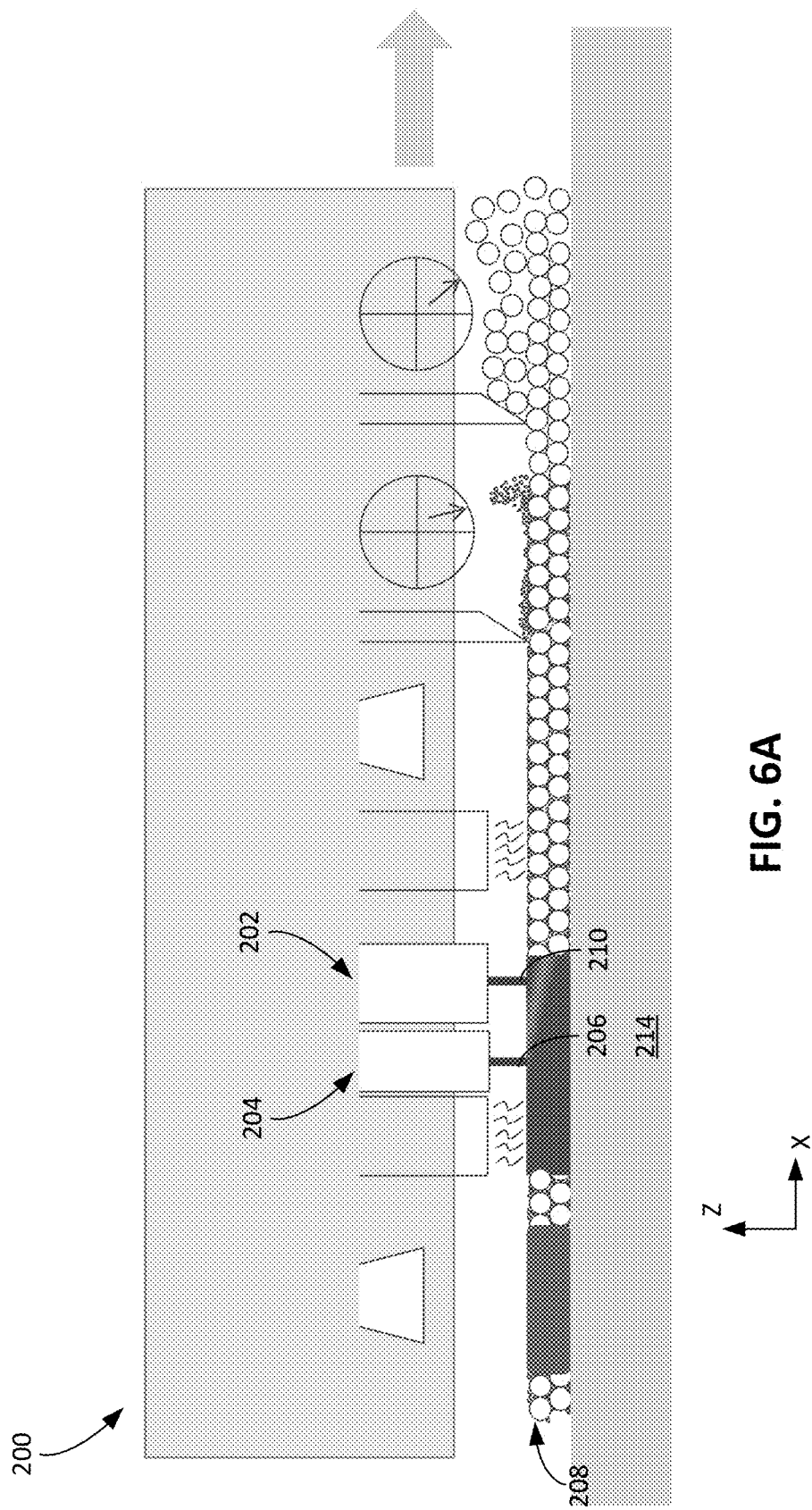
FIGS. 6A and 6B are schematic side and top views, respectively, of another example of an additive manufacturing apparatus.
Figure 6B:
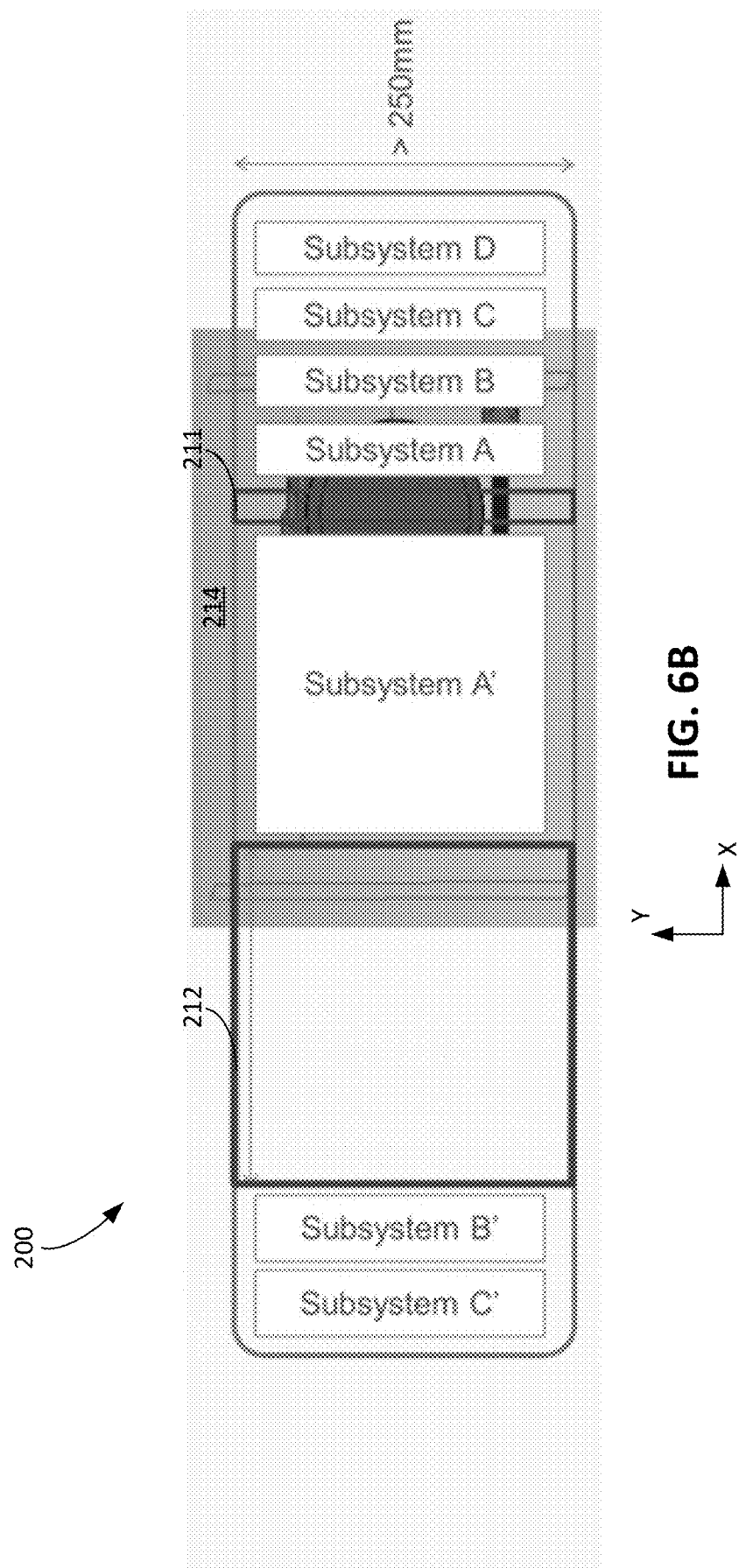

FIGS. 6A and 6B depict an additive manufacturing apparatus 200 similar to the additive manufacturing apparatus 100. The additive manufacturing apparatus 200 differs from the additive manufacturing apparatus 100 in that the additive manufacturing apparatus 200 includes a second energy delivery system 204 in addition to a first energy delivery system 202. The first energy delivery system 202 is similar to the energy delivery system 106 described with respect to the additive manufacturing apparatus 100 and thus propagates a light beam 210 along a path on an uppermost layer 208 of feed material.

Figure 7:
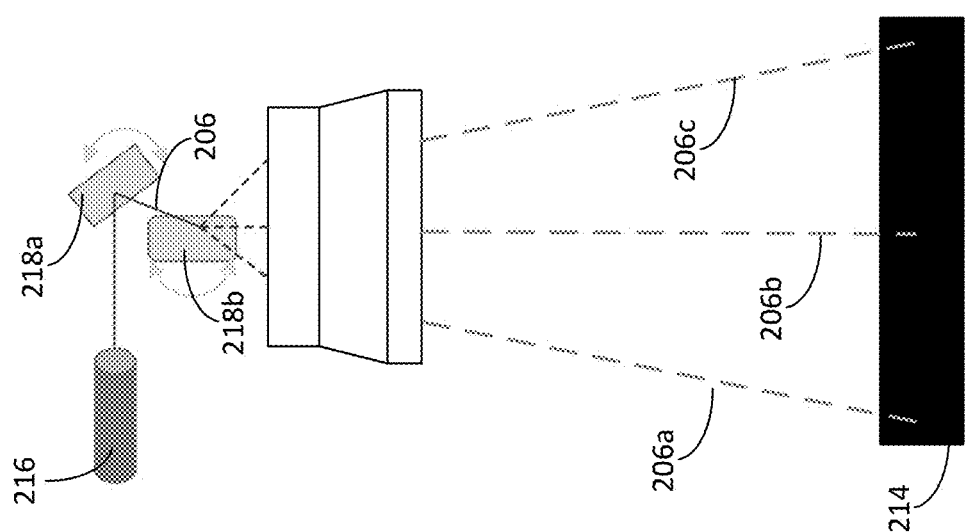
FIG. 7 is a schematic side view of an energy delivery system of the additive manufacturing apparatus of FIG. 6A.

Referring also to FIG. 7, the second energy delivery system 204 includes a light source 216 to generate a light beam 206 to be swept along a vector path (the light beam at different positions along the path are shown by phantom lines 206a, 206b, 206c) on the uppermost layer 208 of feed material. The light source 216 is, for example, part of a mirror galvanometer. The mirror galvanometer can further include one or more reflective members 218a, 218b, e.g., galvo-driven mirrors. In contrast to the reflective member 118 of the energy delivery system 106 (e.g., the reflective member of the energy delivery system 202), the reflective members 218a, 218b of the energy delivery system 204 can be accelerated and decelerated to achieve energy delivery along the desired vector path. In particular, a reflective surface of the reflective member 218a can be moved to control a position of the light beam 206 on the uppermost layer 208 of feed material along the X-axis, and a reflective surface of the reflective member 218b can be moved to control a position of the light beam 206 on the uppermost layer 208 of feed material along the Y-axis. The reflective members 218a, 218b are both reoriented and translated along the X-axis and the Y-axis when moved to control the position of the light beam 206.

Referring to FIG. 6B, motion of the reflective member of the energy delivery system 202 can enable the light beam 210 to sweep across a region 211 extending across an entire width of the platform along the Y-axis. In contrast, a region 212 to which the second energy delivery system 204 can deliver the light beam 206 extends along both the X-axis and Y-axis. In some cases, the region 212 extends along an entire area of a platform 214 of the additive manufacturing apparatus 200.

Rather than selective activation of the light source of the second energy delivery system 204 to sweep the light beam 206 along the desired vector path, the reflective members 218a, 218b are moved to redirect the light beam 206 along the desired vector path. In this regard, the light beam 206 can be continuously emitted while the reflective members 218a, 218b are being moved. The reflective members 218a, 218b can be, for example, incrementally rotated. The reflective members 218a, 218b can be accelerated and decelerated to adjust the trajectory of the path of the light beam 206. Furthermore, in some cases, while the first energy delivery system 202 is advanced along the X-axis relative to the platform 214 to redirect the light beam 114 along paths extending along the X-axis, the light beam 206 of the second energy delivery system 204 can be directed along two-dimensional paths extending along both the X-axis and the Y-axis through motion of the reflective members 218a, 218b of the second energy delivery system 204. For example, the reflective members 218a, 218b of the second energy delivery system 204 can include multiple reflective surfaces movable such that the reflective surfaces are repositionable to receive the light beam 206 and redirect the light beam 206 along a two-dimensional path on the uppermost layer 208.

While the additive manufacturing apparatuses 100, 200 are described to include a single energy delivery system including a light source and a rotatable reflective member, in some implementations, referring to FIGS. 8A-8C, an additive manufacturing apparatus includes multiple energy delivery systems having rotatable reflective members, e.g., polygon mirrors. Referring to FIG. 8A, an additive manufacturing apparatus 300 includes a first energy delivery system 302 and second energy delivery system 304, each energy delivery system 302, 304 including a light source and reflective member similar to the light source 120 and the reflective member 118 described with respect to the energy delivery system 106. The energy delivery systems 302, 304 are both mounted to a support 305, e.g., similar to the support 122.

The energy delivery systems 302, 304, absent motion of the support 305 along the X-axis, direct light beams along paths extending along a horizontal direction. For example, the paths can extend along the Y-axis within regions 306, 308, respectively. The region 306 can overlap the region 308. The paths can be parallel to the Y-axis, and the support 305 can be incrementally advanced so that each energy delivery system 302, 304 can sweep the light beams along a series of parallel paths. These parallel paths do not extend across the entire width of a platform 310 of the additive manufacturing apparatus 300 but, when stitched together, cover a region extending across the entire width of the platform 310. As a result, the energy delivery system 302 can deliver energy to, for example, a first half of a platform 310, and the energy delivery system 304 can deliver energy to a second half of the platform 310.

Referring to FIG. 8B, an additive manufacturing apparatus 400 differs from the additive manufacturing apparatus 300 in that energy delivery systems 402, 404 of the additive manufacturing apparatus 400 are rotatable relative to a support 405 to which the energy delivery systems 402, 404 are mounted. The energy delivery systems 402, 404, absent motion of a support 405 of the additive manufacturing apparatus 400 along the X-axis, direct light beams along paths extending along horizontal directions. For example, the paths can extend along the Y-axis within regions 406, 408, respectively. In contrast to the regions 306, 308, the regions 406, 408 extend along both the X-axis and Y-axis and form a non-zero angle with the Y-axis. The region 406 can overlap the region 408. The support 405 can be incrementally advanced so that each energy delivery system 402, 404 can sweep the light beams along a series of parallel paths, e.g., parallel to one another but angled relative to the Y-axis. These parallel paths do not extend across the entire width of a platform 410 of the additive manufacturing apparatus 400 but, when stitched together, cover a region extending across the entire width of the platform 410. As a result, the energy delivery system 402 can deliver energy to, for example, a first half of a platform 410, and the energy delivery system 404 can deliver energy to a second half of the platform 410.

In some implementations, the energy delivery systems 402, 404 are independently rotatable. As a result, the path of the light beam along the region 406 can be angled relative to the path of the light beam along the region 408. The pattern of light beam coverage for the energy delivery system 402 can thus have paths having angles relative to the Y-axis that differ from angles of paths of the pattern of light beam coverage formed by the energy delivery system 404.

Referring to FIG. 8C, an additive manufacturing apparatus 500 differs from the additive manufacturing apparatus 300 in that a support 505 to which both energy delivery systems 502, 504 are mounted is rotatable relative to a platform 510 of the additive manufacturing apparatus 500. The paths of the light beams delivered by the energy delivery systems 502, 504 can thus be rotated simultaneously with rotation of the support 505. The energy delivery systems 402, 404, absent motion of a support 505 of the additive manufacturing apparatus 400 along the X-axis, direct light beams along paths extending along one or both of the X-axis and the Y-axis within regions 506, 508, respectively. As shown in FIG. 8C, in some cases, the regions 506, 508 do not extend across an entire width of the platform 510. In addition to being movable along the X-axis relative to the platform 510, the support 505 is movable along the Y-axis relative to the platform 510 so that the energy delivery systems 502, 504 to enable energy delivery to a portion 512 of the width that the regions 506, 508 do not cover.

In some implementations, the energy delivery systems 502, 504 are independently rotatable relative to the support 505 in a manner similar to the energy delivery systems 402, 404. In this regard, the angles of the light beam paths can be adjusted through both or either of rotation of the support 505 and independent rotation of the energy delivery systems 502, 504.

Example Patterns of Light Beam Coverage

The additive manufacturing apparatuses described herein, e.g., the additive manufacturing apparatuses 100, 200, 300, 400, and 500, can execute processes to generate various light beam coverage patterns. Referring to FIG. 9A, a process 600 includes an operation 602 in which contours defining a perimeter of an object 610 in a layer (as opposed to voxels in the interior of the object in a layer) are formed. If the second energy delivery system 204 described with respect to FIGS. 6A, 6B, and 7 is present, the second energy delivery system 204 can sweep a light beam across a two-dimensional vector path to cure the feed material corresponding to one of the contours, e.g., one of the inner and outer contours. The data defining the pattern of light beam coverage can define the vector path across which the light beam is swept. The second energy delivery system 204 can sweep the light beam across another two-dimensional vector path to cure the feed material corresponding to the other of the contours, e.g., the other of the inner and outer contours.

Referring to FIGS. 9A-9D, the set of operations 604A, 606A, 608A (FIG. 9A) can be performed, the set of operations 604B, 606B, 608B (FIG. 9B) can be performed, the set of operations 604C, 606C, 608C (FIG. 9C), or the set of operations 604D, 606D, 608D can be performed to fuse an interior of the object 610, e.g., the area bounded by the contours formed at operation 602. The operation 602 combined with the set of operations 604A, 606A, 608A, the set of operations 604B, 606B, 608B, or the set of operations 604C, 606C, 608C enables the object 610 to be formed.

Referring to FIG. 9A, at operation 604A, the light beam from the energy delivery system is directed along parallel horizontal rows of an uppermost layer of feed material. The horizontal rows extend along the Y-axis. The swept paths of the light beam are continuous and span across an entire width of the region of the feed material delivery area. For example, the reflective member of the energy delivery system is continuously rotated, and the light source is continuously activated to form one of the horizontal rows.

The horizontal rows are separated from one another by regions to which the light beam is not directed. In this regard, as the support to which the energy delivery system is mounted is advanced along the X-axis, the energy delivery system is selectively operated to sweep the light beam along paths separated from one another. In some cases, the support is advanced in sufficiently large increments to enable such separation between the swept paths.

Alternatively, the energy delivery system is activated only during selected incremental positions of the support, each increment corresponding to a single voxel of feed material. During other incremental positions, the reflective member is continuously rotated, but the light source does not emit the light beam.

At operation 606A, the light beam from the energy delivery system is directed along parallel horizontal rows extending along the X-axis. The horizontal rows are separated from one another by regions to which the light beam is not directed. As the reflective member continuously rotates, the light source is selectively activated such that portions of the uppermost layer of feed material that receive the light beam are separated by portions that do not receive the light beam. The light source is, for example, pulsed while the reflective member 118 is continuously rotated such that energy is delivered to a discontinuous set of voxels extending along the X-axis. In alternative examples, if the support for the energy delivery system is rotatable relative to the platform, the support can be reoriented such that the energy delivery system can cause the light beam to sweep such horizontal rows extending along the X-axis.

At operation 608A, the light beam from the energy delivery system is directed along parallel horizontal rows extending along the Y-axis. The horizontal rows of the operation 608A are offset from the horizontal rows of operation 604A but can be formed with similar operation of the energy delivery system and the support.

Referring to FIG. 9B, operations 604B, 606B, and 608B differ from operations 604A, 606A, 608A in that the horizontal rows formed in operations 604B and 608B are at non-zero angles relative to the Y-axis and the horizontal rows formed in operation 606B are at non-zero angles relative to the X-axis. In some implementations, the horizontal rows formed in operations 604B and 608B are formed in a manner similar to formation process for the horizontal rows for operation 606C. In particular, the reflective member is rotatable to sweep the light beam along a horizontal path parallel to the Y-axis, but the light source is selectively activated to form angled horizontal rows with at least one voxel of unfused feed material. Alternatively, as described with respect to the support 122 of the additive manufacturing apparatus 100, paths of the light beam delivered by the energy delivery system 106 can be reoriented relative to the Y-axis such that the paths form non-zero angles relative to the Y-axis. In this regard, the horizontal rows formed in operations 604B and 608B can be angled through rotation of the support to which the energy delivery system 106 is mounted.

Similarly, the horizontal rows in operation 606B can be generated through selective operation of the energy delivery system. The energy delivery system can have the same orientation as it had for operations 604B and 608B. Alternatively, at operation 606B, the energy delivery system can be reoriented, e.g., through rotation of the support to which the energy delivery system is mounted.

Referring to FIG. 9C, in some implementations, sectors of the interior of the object 610 are fused sequentially. At operation 604C, a first sector is fused by sweeping the light beam through horizontal rows. While depicted as horizontal rows angled relative to both the X-axis and Y-axis, the rows can be horizontal rows at any appropriate angle. At operation 606C, a second sector is fused by sweeping through horizontal rows. The horizontal rows of operation 606C can have angles similar to the angles of the horizontal rows of operation 604C.

To allow the first sector fused at operation 604C to cool, the second sector fused at operation 606C can be separated from the first sector, e.g., by a third sector to be fused at operation 608C. For example, edges defining the first sector can be separated from edges defining the second sector. This separation can provide time for the first sector to cool after fusing. Rather than continuing to deliver energy to portions adjacent to the first sector, at operation 606C, energy is delivered to the non-adjacent second sector. Then, at operation 608C, the third sector separating the first and second sectors can be fused.

Referring to FIG. 9D, in some implementations, multiple energy delivery systems are operated to perform operations 604D, 606D, and 608D, e.g., in accordance implementations described with respect to the additive manufacturing apparatuses 300, 400, 500. A feed material delivery area 612 to which feed material is delivered is divided into distinct regions 614*a*-614*d*. The patterns shown in FIG. 9D for operations 604D, 606D, 608D are similar to the patterns shown in FIG. 9A for operations 604A, 606A, 608A. However, for operations 604D, 606D, 608D, multiple energy delivery systems are operated to deliver energy to the different regions 614*a*-614*d*. If two energy delivery systems are present, a first of the energy delivery systems sweeps the light beam along horizontal rows in the region 614*a* and along horizontal rows in the region 614*b* for operations 604D, 606D, 608D, and a second of the energy delivery systems sweeps the light beam along horizontal rows in the region 614*c* and along horizontal rows in the region 614*d* for operations 604D, 606D, and 608D.

In some implementations, the first energy delivery system sweeps the light beam along the horizontal rows in the region 614*b* while the second energy delivery system sweeps the light beam along the horizontal rows in the region 614*c*. The first energy delivery system then sweeps the light beam along the horizontal rows in the region 614*a* while the second energy delivery system sweeps the light beam along the horizontal rows in the region 614*d*. Because the regions 614*b*, 614*c* have non-overlapping edges and the regions 614*a*, 614*d* have non-overlapping edges, such a sequence of fusing the feed material can reduce heat build-up that can occur as a result of simultaneously fusing feed material in adjacent regions.

Other patterns of light beam coverage are possible. For example, referring to FIG. 10, similar to the implementations described with respect to FIG. 9D, a feed material delivery area 712 is divided into regions 714*a*-714*d* so that multiple energy delivery systems can selectively and sequentially sweep light beams through the regions 714a-714d. In contrast to the processes described with respect to FIGS. 9A-9D, in process 700, multiple sets of contours of an object 710 are formed, with one set of the contours defining a first interior portion 716a and another set of the contours defining a second interior portion 716b. As shown in operation 702, in a manner similar to that described for operation 702, the contours can be fused. The interior portions 716a, 716b can then be fused at operations 704, 706, 708 to form the object 710. As shown in operation 704, within a single region 714a, 714b, 714c, or 714d, an energy delivery system can selective emit the light beam to generate a pattern of fused material including first horizontal rows and second horizontal rows at a non-zero angle relative to the first horizontal rows. The multiple energy delivery systems can each be operated in such a manner such that each of the regions 714a-714d can have similar patterns. Furthermore, the energy delivery systems can deliver energy to the interior portion 716a to form third horizontal rows at a non-zero angle relative to the horizontal rows of the interior portion 716b, e.g., both the first horizontal rows and the second horizontal rows.

Alternative Implementations

Controllers and computing devices can implement these operations and other processes and operations described herein. As described above, the controller 108 of the apparatus 100 can include one or more processing devices connected to the various components, systems, and subsystems of the apparatus 100. The controller 108 can coordinate the operation and cause the apparatus 100 to carry out the various functional operations or sequence of steps described above. The controller 108 can control the movement and operations of the systems of the printhead 126.

The controller 108 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 108 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 108, e.g., as controlled by firmware or software, can interpret the data object received from the computer to generate the set of signals necessary to control the components of the apparatus 100 to fuse the specified pattern for each layer.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The printhead of FIG. 1A includes several systems that enable the apparatus 100 to build objects. In some cases, instead of a printhead, an AM apparatus includes independently operated systems, including independently operated energy sources, dispensers, and sensors. Each of these systems can be independently moved and may or may not be part of a modular printhead. In some examples, the printhead includes only the dispensers, and the apparatus include separate energy delivery systems mounted to supports independent from supports for the dispensers.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

A number of implementations have been described. Nevertheless, it will be understood that various modifications may be made. For example,

- Various components described above as being part of the printhead, such as the dispensing system(s), spreader(s), sensing system(s), heat source and/or energy source, can be mounted on the gantry instead of in the printhead, or be mounted on the frame that supports the gantry.
- The platform can have width between 200 mm and 2000 mm, e.g., between 500 mm and 1000 mm, about 400 mm, about 500 mm, about 600 mm, about 700 mm, etc.
- The region to be covered by a single energy delivery system can span a width between 100 mm to 1000 mm, e.g., between 250 mm and 500 mm, about 200 mm, about 250 mm, about 300 mm, etc.
- The energy delivery system 106 can be advanced incrementally along the Y-axis so that the light beam can be delivered across an entire length of the platform 102. In some cases, the energy delivery system 106 is advanced an increment at the end of a single path across the platform 102. The light source 120 can be controlled such that the light beam 114 is not emitted when the energy delivery system 106 is being advanced, for example, as the predicted location of the light beam 114 incident on the reflective member 118 moves from one facet to another facet.

Accordingly, other implementations are within the scope of the claims.

What is claimed is:

1. An additive manufacturing apparatus comprising:
   a platform;
   a dispenser to dispense a plurality of layers of feed material on a top surface of the platform; and
   an energy delivery assembly comprising
     a light source to emit a light beam, a first reflective member having a plurality of reflective facets, the first reflective member positioned in a path of the light beam to receive the light beam and redirect the light beam toward the top surface of the platform to deliver energy to an impingement spot on an uppermost layer of the layers of feed material, wherein the first reflective member is rotatable such that sequential facets sweep the impingement spot of the light beam on the uppermost layer sequentially along a linear path along a first direction on the uppermost layer; and a second reflective member comprising at least one second reflective surface positioned in the path of the light beam, the second reflective member being movable so as to reposition the linear path of the impingement spot of the light beam on the uppermost layer such that the sequential facets of the first reflective member sweep the impingement spot of the light beam on the uppermost layer sequentially along a second direction on the uppermost layer at a non-zero angle to the first direction.

2. The apparatus of claim 1, wherein the second reflective member is positioned in the path of the light beam between the light source and the first reflective member.

3. The apparatus of claim 1, wherein the first reflective member comprises a polygon mirror defining a regular convex polygon.

4. The apparatus of claim 1, wherein the second reflective member comprises a mirror galvanometer.

* * * * *